(12) United States Patent
Le Glaunec et al.

(10) Patent No.: US 8,463,040 B2
(45) Date of Patent: Jun. 11, 2013

(54) AUTOMATIC TABLE LOCATION IN DOCUMENTS

(75) Inventors: Vincent Jean-Marie Noël Le Glaunec, Brunoy (FR); Christophe Antoine Leynadier, Maison Alfort (FR)

(73) Assignee: OCE Technolgies B.V., Venlo (NL)

( * ) Notice: Subject to any disclaimer, the term of this patent is extended or adjusted under 35 U.S.C. 154(b) by 0 days.

(21) Appl. No.: 13/359,989

(22) Filed: Jan. 27, 2012

(65) Prior Publication Data

US 2012/0177290 A1    Jul. 12, 2012

Related U.S. Application Data

(63) Continuation of application No. PCT/EP2010/060205, filed on Jul. 15, 2010.

(30) Foreign Application Priority Data

Jul. 30, 2009    (EP) .................................. 09305718

(51) Int. Cl.
*G06K 9/36* (2006.01)
(52) U.S. Cl.
USPC ........................................................ 382/176
(58) Field of Classification Search
None
See application file for complete search history.

(56) References Cited

U.S. PATENT DOCUMENTS

| | | | |
|---|---|---|---|
| 5,502,777 A | | 3/1996 | Ikemure |
| 5,572,602 A | * | 11/1996 | Naoi et al. ................ 382/178 |
| 5,774,584 A | | 6/1998 | Matsumoto et al. |
| 5,907,630 A | * | 5/1999 | Naoi et al. ................ 382/173 |
| 5,923,782 A | | 7/1999 | Chhabra et al. |
| 6,005,976 A | * | 12/1999 | Naoi et al. ................ 382/202 |
| 6,173,073 B1 | * | 1/2001 | Wang ........................ 382/176 |
| 2002/0154818 A1 | | 10/2002 | Najman et al. |
| 2003/0086615 A1 | | 5/2003 | Dance et al. |
| 2006/0082595 A1 | | 4/2006 | Liu et al. |
| 2009/0016605 A1 | | 1/2009 | Chao et al. |

FOREIGN PATENT DOCUMENTS

EP    1 237 115 B1    5/2005

* cited by examiner

*Primary Examiner* — Wenpeng Chen
*Assistant Examiner* — Feng Niu
(74) *Attorney, Agent, or Firm* — Birch, Stewart, Kolasch & Birch, LLP

(57) ABSTRACT

A method for locating tables in documents includes defining a plurality of tiles for a document, for each tile, determining a horizontal profile and a vertical profile, determining the location of lines by means of gradients of the horizontal profiles and the vertical profiles, selecting from the lines, the lines that are persistent, determining a rectangle in at least one corner of the document based on the persistent lines, and applying heuristics in order to accept or reject a determined rectangle as a table of the document. An apparatus for automatically locating a table in a document applies the method for locating tables in documents.

10 Claims, 11 Drawing Sheets

AUTOMATIC TABLE LOCATION IN DOCUMENTS

CROSS-REFERENCE TO RELATED APPLICATIONS

This application is a Continuation of International Application No. PCT/EP2010/060205, filed on Jul. 15, 2010, and for which priority is claimed under 35 U.S.C. §120, and which claims priority under 35 U.S.C. §119 to Application No. 09305718.0, filed on Jul. 30, 2009. The entirety of each of the above-identified applications is expressly incorporated herein by reference.

BACKGROUND OF THE INVENTION

1. Field of the Invention

The present invention relates to a method for automatically locating tables in documents, the method comprising the steps of defining a plurality of tiles for a document; determining a horizontal profile and a vertical profile for each tile; detecting lines by means of the profiles; determining at least one rectangle from the lines and accepting from the at least one rectangle a rectangle as a table of a document.

The present invention also relates to an apparatus for automatically locating a table in a document by application of the method.

2. Background of the invention:

Such tables may be, for example, the whole or parts of tables present on forms (a "table", here, being a two-dimensional assembly of cells). However, the present invention is of particular interest with regard to the automatic locating of title blocks (or "legends") in technical drawings. In the present document, the term "table" is used to designate all of the aforementioned examples, and table-like structures in general.

The techniques of the present invention will usually, but not exclusively, be applied to representations of documents in the form of bitmaps, obtained by scanning analogue documents or creating digital documents.

There are many fields in which it would be advantageous to be able to automatically detect the location of tables present in documents. One example is form processing: it is desirable to be able to automatically locate cells in tables on the forms, so that database entries can be generated automatically by reading data in the cells. Various proposals have already been made in this field. However, the majority of form-recognition computer programs currently available rely on the recognition of forms in constrained poses within images consisting of the form itself and little else.

Automatic table location is of particular interest in the field of processing technical drawings (such as mechanical engineering drawings or architectural drawings). In the latter field, if the title block of the drawing can be located automatically then the following processes can be realized:

- automatic folding of the drawing such that the title block remains visible;
- positioning of the drawing in the correct orientation (since the title block generally is located in a specified corner with respect to the image, for example, bottom right);
- in the processing of scanned images of drawings, for example using a personal computer, the title block can be displayed at an enlarged scale, to assist in manual indexing; and
- a first step is taken in the automatic indexing of drawings: once the title block has been located it is then simply a question of extracting the information contained therein.

Various standards have been defined at national and international levels, governing the content and positioning of title blocks (legends) in technical drawings. These standards include ISO 5457 and ISO 7200 and French national standard NF E 04-503. More specifically the standards are explained in European patent EP 1237115.

A method of the type mentioned above is disclosed in European patent EP 1237115, wherein tables are located by analysis of sub-regions thereof, which are analogous to the tiles in the present invention. A tile is defined as a sub-region of the image, which consists of a number of pixels that form a solid rectangle, solid triangle, solid hexagon or any other solid polygon. The number of pixels of the solid polygon is defined as the tile size. The analysis in EP 1237115 involves determining the location of lines by creating a horizontal and vertical profile based on a sum of black pixels on each row of pixels in a tile, preferably a solid rectangle. Lines having lengths above a certain threshold are determined and assigned to groups. A set of adjacent lines is assigned to a common group, if the separation between adjacent pairs of lines within the set is less than a threshold value. A rectangle is selected from all investigated rectangles as the location of a table, if it contains a group with the greatest number of lines among all investigated rectangles. When the technique is applied to locating title-blocks in technical drawings, rectangles are analyzed that correspond to the corners or ends of the document.

A disadvantage of the method according to EP 1237115 is that only corners or ends of documents are analyzed. In the case of, for example, large margins of the documents, the title-blocks may not be discovered. Moreover, the determination of title blocks by means of the horizontal profiles and vertical profiles is based on the sum of black pixels on each determined row of pixels in the image. Such a determination is not applicable on a continuous tone image. Another disadvantage of the method according to EP 1237115 is that slant effects of title-blocks are not covered.

SUMMARY OF THE INVENTION

An object of the present invention is to overcome the problems and disadvantages inherent in the background art method of table location. More particularly, the object of the present invention is to provide a robust table-location method and apparatus in which specific tables present on a document can be located reliably and quickly.

An object of the invention is achieved in a method of the above-mentioned kind, further comprising the steps of determining a location of a line by means of a gradient of one of the horizontal profiles and the vertical profiles; selecting from the located lines, the lines which are persistent; and determining at least one rectangle from the persistent lines and for each determined rectangle applying heuristics in order to accept or reject the rectangle as a table of the document.

By using the gradient of a profile, a local extreme may be detected. A local maximum followed by a local minimum with a predetermined difference threshold, is a strong indication of the presence of a line in the image. By doing so, the method is particularly suited for a continuous tone image. The tile size may be changed without any change in the result, even for moth-eaten or dashed lines. Moreover this method is robust to noise when the profiles are calculated as a mean of grey values in a column or row of the tile, since the noise is smoothed by the mean.

In an advantageous embodiment, the plurality of tiles cover at least part of an image of the document, overlap each other by a predetermined overlap factor and have a predetermined tile size. A higher overlap factor increases the accuracy of the method, since a line over consecutive tiles is not cut into small pieces, preventing the small pieces to be considered as noise rather than a part of a line. The tile size has also consequences on accuracy and performance of the method. A high value of the tile size will decrease accuracy but performance will be better. The tile size may be tuned for application of the method for small formats, for wide formats or for both small and wide formats.

According to a next embodiment, the step of determining the at least one rectangle from the persistent lines comprises the step of determining margins of the document and taking the largest rectangle in a corner taking said margins into account. This is advantageous in the case of inked area borders. The inner lines of the inked area borders may be considered as the borders of the image.

According to a next embodiment, the step of determining the location of a line by means of a gradient of one of the horizontal profiles and the vertical profiles comprises the step of determining a gradient threshold value and inspecting the gradient in order to find a local maximum in the gradient followed by a local minimum in the gradient, wherein an absolute difference between the local maximum and the local minimum is bigger than the gradient threshold value. By doing so, the gradient threshold filters out the less extreme local extremes, which have less chance to be a line of a table of the document.

According to a next embodiment, the step of selecting lines that are persistent comprises the step of awarding a line persistency dependent on the width of the line. If the line width is above a predetermined width, it probably is not part of a line, but is a solid full color area.

According to a next embodiment, the step of selecting lines that are persistent comprises the steps of determining a number of consecutive tiles and awarding a line persistency dependent on the presence of the line in all of the number of consecutive tiles. By doing so, small lines are excluded from being considered to be a line of a table of a document.

According to a next embodiment, the step of selecting lines that are persistent comprises the steps of determining a tolerance parameter and considering lines in consecutive tiles, which lines are not separated by more pixels than the value of the tolerance parameter, as the same persistent line. This is advantageous, since slanted lines may be detected and taken into account in order to detect the table of the document.

According to a next embodiment, the acceptation and rejection of the determined rectangles depends on the ratio of the two dimensions height and width of the rectangle. To be considered as a possible table of the document, the rectangle must be large enough in two dimensions to contain a number of label words in an easily readable well-arranged way. A rectangle that is too "thin" in one direction is rejected as being a possible table of the document.

According to a next embodiment, the acceptation and rejection of the determined rectangles depends on the presence of rectangles in at least one of the corners of the image of the document and on the orientation of the image of the document. To be considered as a possible table of the document, the rectangle must be close enough to the borders of the image. It depends on the orientation of the image of the document, which corners are more preferred to contain a table of the document.

The present invention further provides an apparatus for automatically locating tables in documents by application of the above-mentioned method. The method may be used in both print and copy paths of printer controllers and in applications for folding services. When a table in a document is detected, a rotation may be applied to the image of the document in order to orient the document so that the table is on top of the folded document.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
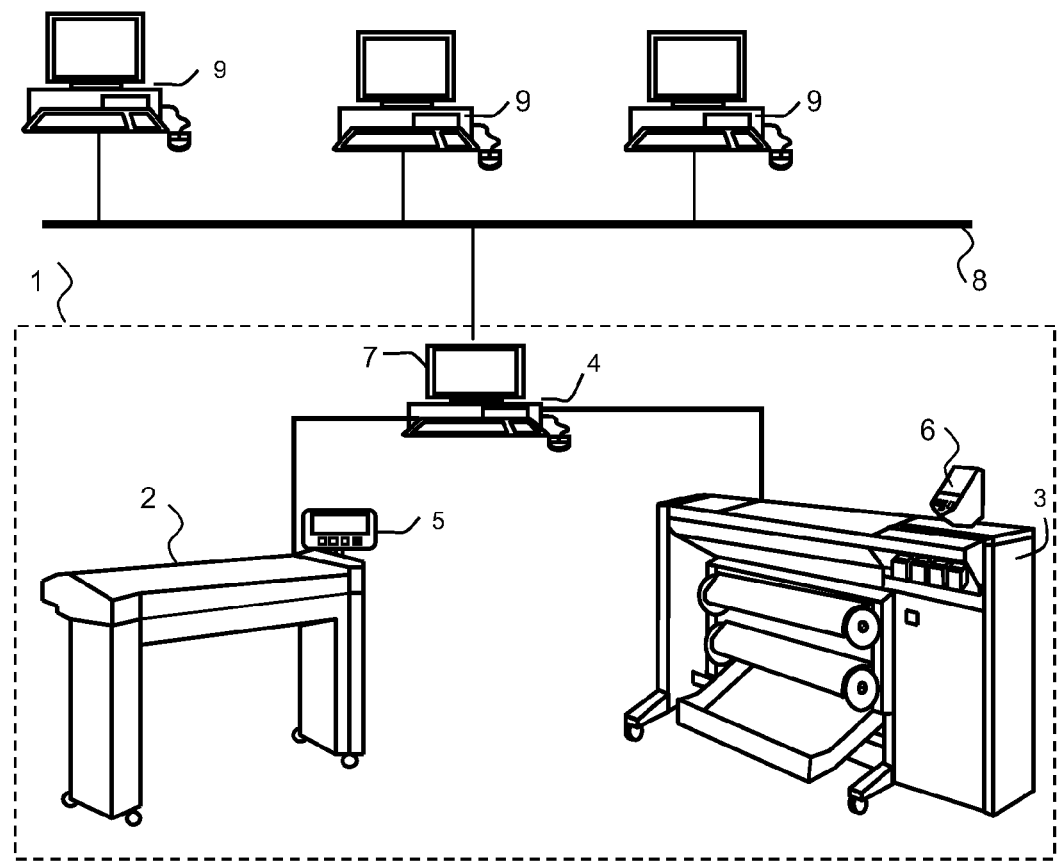
FIG. 1 is a schematic diagram of an environment in which the present invention may be used.

FIG. 1 is a schematic diagram of an environment in which the present invention may be used. The reprographic system 1 as presented here comprises a scanning unit 2, a printing unit 3 and a control unit 4.

The scanning unit 2 is provided for scanning an original color document supported on a support material. The scanning unit is provided with a CCD type color image sensor (i.e. a photoelectric conversion device), which converts the reflected light into electric signals corresponding to the primary colors red (R), green (G) and blue (B). A local user interface panel 5 is provided for starting scan and copy operations.

The printing unit 3 is provided for printing digital images on image supports. The printing unit may use any number of printing techniques. It may be a thermal or piezoelectric inkjet printer, a pen plotter, or a press system based on organic photoconductor technology, for instance. In the example shown in FIG. 1, printing is achieved using a wide format inkjet printer provided with four different basic inks, such as cyan, magenta, yellow and black. The housing contains a printhead, which is mounted on a carriage for printing swaths of images. The images are printed on an ink receiving medium such as a sheet of paper supplied by a paper roll. A local user interface panel 6 is provided with an input device such as buttons for selecting a user, a job and starting a printing operation, etc.

The scanning unit 2 and the printing unit 3 are both connected to a control unit 4. The control unit 4 executes various tasks such as receiving input data from the scanning unit 2, handling and scheduling data files, which are submitted via a network 8, controlling the scanning unit 2 and the printing unit 3, converting image data into printable data, etc. The control unit is provided with a user interface panel 7 for offering the operator an extensive menu of commands for executing tasks and making settings.

Moreover, the control unit is connected to the network 8 so that a number of client computers 9, also connected to the network, may make use of the reprographic system 1.

Figure 2:
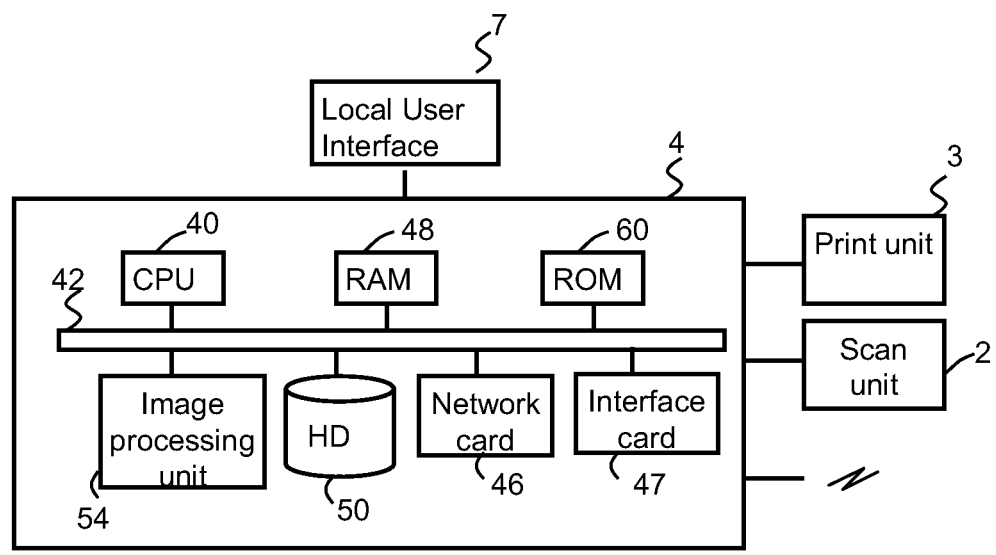
FIG. 2 is a schematic diagram of a control unit of a reprographic system according to FIG. 1.

The control unit is in more detail presented in FIG. 2. As shown in FIG. 2, the control unit 4 of the reprographic system 1 comprises a Central Processing Unit (CPU) 40, a Random Access Memory (RAM) 48, a Read Only Memory (ROM) 60, a network card 46, an interface card 47, a hard disk (HD) 50 and an image processing unit 54 (such as a Raster Image Processor or RIP). The aforementioned units are interconnected through a bus system 42.

The CPU 40 controls the respective units of the control unit 4, the local user interface 7, in accordance with control programs stored on the ROM 60 or on the HD 50. The CPU 40 also controls the image processing unit 54.

The ROM 60 stores programs and data such as a boot program, a set-up program, various set-up data or the like, which are to be read out and executed by the CPU 40.

The hard disk 50 is an example of a storage unit for storing and saving programs and data which make the CPU 40 execute a print process to be described later. The hard disk 50 also comprises an area for saving the data of externally submitted print jobs. The programs and data on the HD 50 are read out onto the RAM 48 by the CPU 40 as needed. The RAM 48 has an area for temporarily storing the programs and data read out from the ROM 60 and HD 50 by the CPU 40, and a work area that is used by the CPU 40 to execute various processes.

Interface card 47 connects the control unit to scanning unit 2 and printing unit 3.

Network card 46 connects the control unit 4 to the network 8 and is designed to provide communication with the workstations 9, and with other devices reachable via the network.

The image processing unit 54 may be implemented either as a software component of an operating system running on the control unit 4 or as a firmware program embodied in an FPGLA. The image processing unit 54 has functions for reading, interpreting and rasterizing the print job data. The print job data contains image data to be printed (i.e. fonts and graphics that describe the content of the document to be printed, described in a Page Description Language or the like), image processing attributes and print settings. In an advantageous embodiment, the image processing unit 54 carries out the method according to the present invention.

Basic modes of operation of the reprographic system are scanning, copying and printing.

With the electric signals corresponding to the primary colors red (R), green (G) and blue (B) obtained during scanning, a digital image is assembled in the form of a raster image file. A raster image file is generally defined to be a rectangular array of regularly sampled values, known as pixels. Each pixel (picture element) has one or more numbers associated with it, generally specifying a color that the pixel should be displayed in. The representation of an image may have each pixel specified by three 8 bit (24 bits total) colorimetric values (ranging from 0-255) defining the amount of R, G, and B respectively in each pixel. In the right proportions, R, G, and B can be combined to form black, white, 254 shades of grey, and a vast array of colors (about 16 million colors). The digital image obtained by the scanning unit 2 may be stored on a memory of the control unit 4 and be handled according to a copy path, wherein the image is printed by the print engine 3.

Alternatively, the digital image may be transferred from the controller to a client computer 9 (scan-to-file path).

Finally a user of the client computer 9 may decide to print a digital image, which reflects the printing mode of operation of the system.

Figure 3:
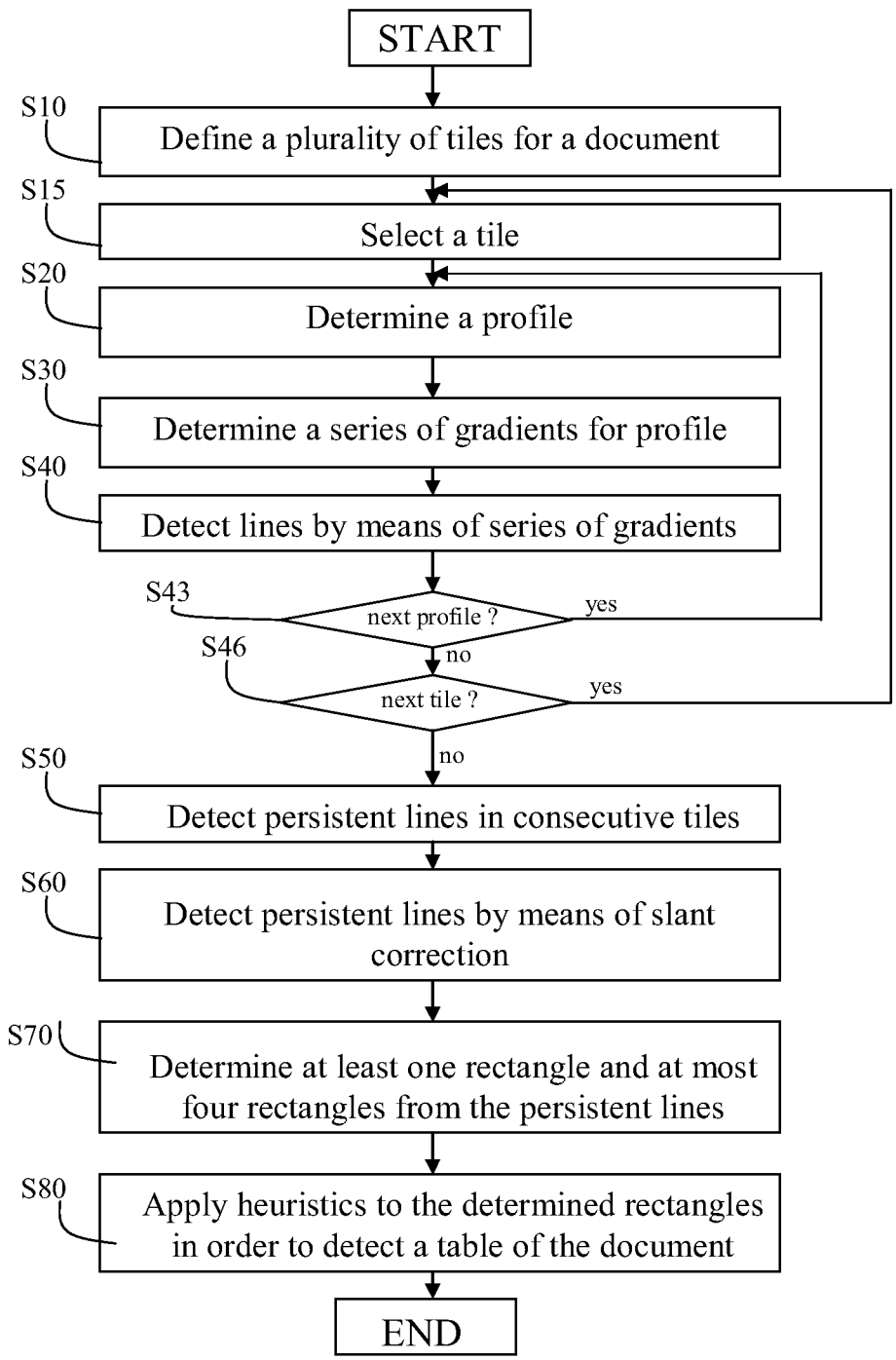
FIG. 3 is a flow diagram of the method in order to detect a table in the document.

A flow diagram of the method according to the present invention shown in FIG. 3 consists of a number of steps S10-S80.

The method starts with a step S10 of defining a plurality of tiles for a document. An image of a document consists of pixels. The plurality of tiles cover the pixels of the image and are used for searching and detecting lines in the image in the next four steps S15, S20, S30 and S40.

In step S15 a tile is selected. Next, a profile is determined (step S20). For the determined profile, a series of gradients is determined (step S30). In the next step S40, lines are detected from the series of gradients. This step will be further detailed in FIG. 4. After the detection of lines from a profile in a next step S43, it is checked if a next profile is available. If so (yes), the method returns to step S20. If not (no), both profiles, horizontal and vertical, have been processed, so no next profile is available and the method continues with step S46. In the step S46, it is checked if a next tile is available. If so (yes), the method returns to step S15. If not (no), all tiles have been processed, so no next tile is available and the method continues with step S50.

Figure 6:
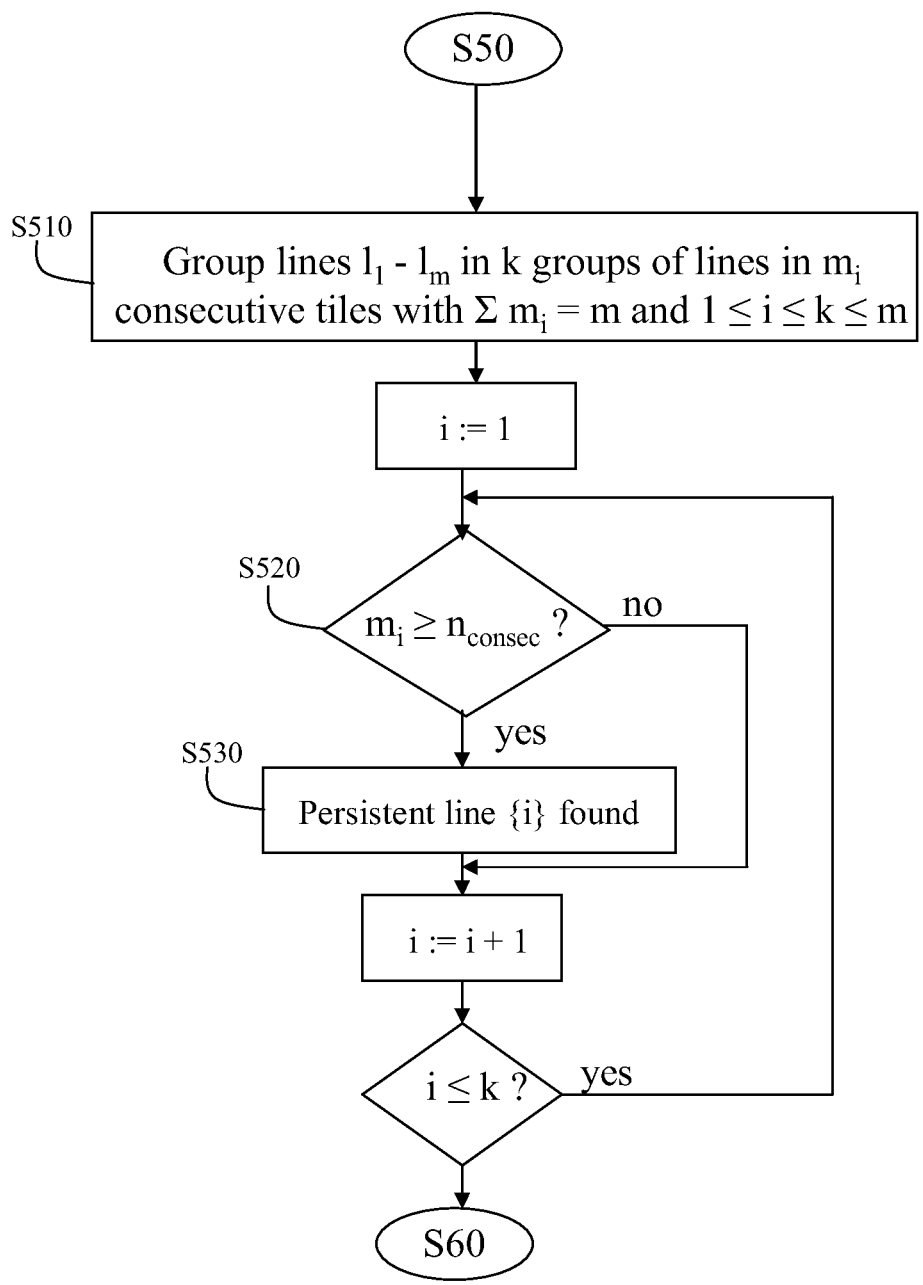
FIG. 6 is a flow diagram in order to detect persistent lines by means of a tolerance parameter.

In step S50, persistent lines in a number of consecutive tiles are detected. This step will be further detailed in FIG. 6. In step S60 persistent lines by means of slant correction are detected. The step S60 is applied to the persistent lines that have been detected in a previous step S50, as well as to the lines detected by means of a series of gradients, which do not belong to persistent lines detected in the previous step S50. The step S60 will be further detailed in FIG. 8.

The next step S70 is a determination of at least one rectangle and at most four rectangles from the persistent lines. It concerns rectangles in the corners of the image.

The last step S80 is to apply heuristics to the determined rectangles in order to detect a table for the document.

The steps S10-S80 will now be described in further detail.

The method starts with the step S10 of defining a plurality of tiles for a document. An image of a document consists of a plurality of pixels. The plurality of tiles covers the image and is used for searching and detecting lines. The method cuts the image in tiles in a horizontal direction and a vertical direction. Preferably, each tile is a solid square of pixels, but may have an appropriate other form such as rectangular, triangular, hexagonal, etc. From here on, a tile is assumed to be square. Each tile has a tile size, which is defined as the number of pixels of the solid square. A default tile size may be defined. For wide formats, e.g. A0 format, a tile size of 50×50 pixels gives a good result according to experiments of the applicant. For smaller formats, an appropriate smaller tile size may be selected, for example, at equivalent resolution of the image, for A3 format a tile size of 12×12 pixels may be optimal (Note that 12≈50/4). A maximum tile size may also be defined, e.g. the image size. The tile size has consequences on accuracy and performance of the method. A high value of the tile size may decrease accuracy but performance may be better. At a high value of the tile size, the number of tiles decreases and the number of calculations decreases and the performance will be better.

A next step S15 is to select a tile from the plurality of tiles defined in the previous step S10. The next three steps S20, S30, S40 are applied to this tile and then a next tile is investigated.

A next step S20 is to determine a horizontal profile for the selected tile. Each pixel in a tile may have a grey level that varies from 0, a white pixel, to 1, a black pixel. In a particular embodiment of the method, the grey level goes up in 255 steps from 0 to 1. A horizontal profile of a tile consists of a number of values, each value being calculated from a pixel row of the tile. A vertical profile of a tile consists of a number of values, each value being calculated from a pixel column of the tile. Preferably, the values of the horizontal profile and the values of the vertical profile are determined in the same manner. A value of a horizontal profile may be determined by calculating the quotient of the summation of grey levels in a pixel row and the total number of pixels in the pixel row. A value of a vertical profile may be determined analogously by calculating the quotient of the summation of grey levels in a pixel column and the total number of pixels in the pixel column. By doing so, the determined profile value may vary between 0 and 1 and the number of values of a profile equals the tile size. Even if the image consists of grey level data, the profiling calculations are established by taking a mean of the grey levels of the pixels in a row or column. In particular, the method may also be applied on a continuous tone image. By using the mean of grey levels, the tile size may be changed without any change in the result, even for moth-eaten or dashed lines. Moreover, this method is robust to noise which is smoothed by the mean.

After the steps S30, S40 are applied to the horizontal profile, the method returns to step S15 and a vertical profile is determined in step S20 and the same steps S30, S40 are executed for this vertical profile. The order in which the profiles are moved along in the step S20 is tile for tile, and per tile a horizontal profile followed by a vertical profile, but may without any consequences also be tile for tile, and per tile a vertical profile followed by a horizontal profile.

A next step S30 is to determine a series of gradients for the profile under investigation. According to the method, the series of gradients is defined as a series of one-dimensional gradients. Each one-dimensional gradient is determined by an approximation of a derivative function of the profile by calculating a difference quotient as a degree of change in the grey levels between two adjacent pixel rows in the image or between two adjacent pixel columns in the image. For each pair of adjacent pixel rows, a difference quotient is calculated by taking the quotient of the difference of profile values of adjacent pixel rows and the distance between the adjacent pixel rows in the case of a horizontal profile. The difference quotient for a pair of adjacent pixel rows is called a horizontal gradient. For a vertical profile difference, quotients are calculated analogously. The difference quotient for a pair of adjacent pixel columns is called a vertical gradient. By presuming that the distance between adjacent pixel rows and the distance between adjacent pixel columns is equal to 1, a difference quotient is calculated by dividing by 1.

Figure 4:
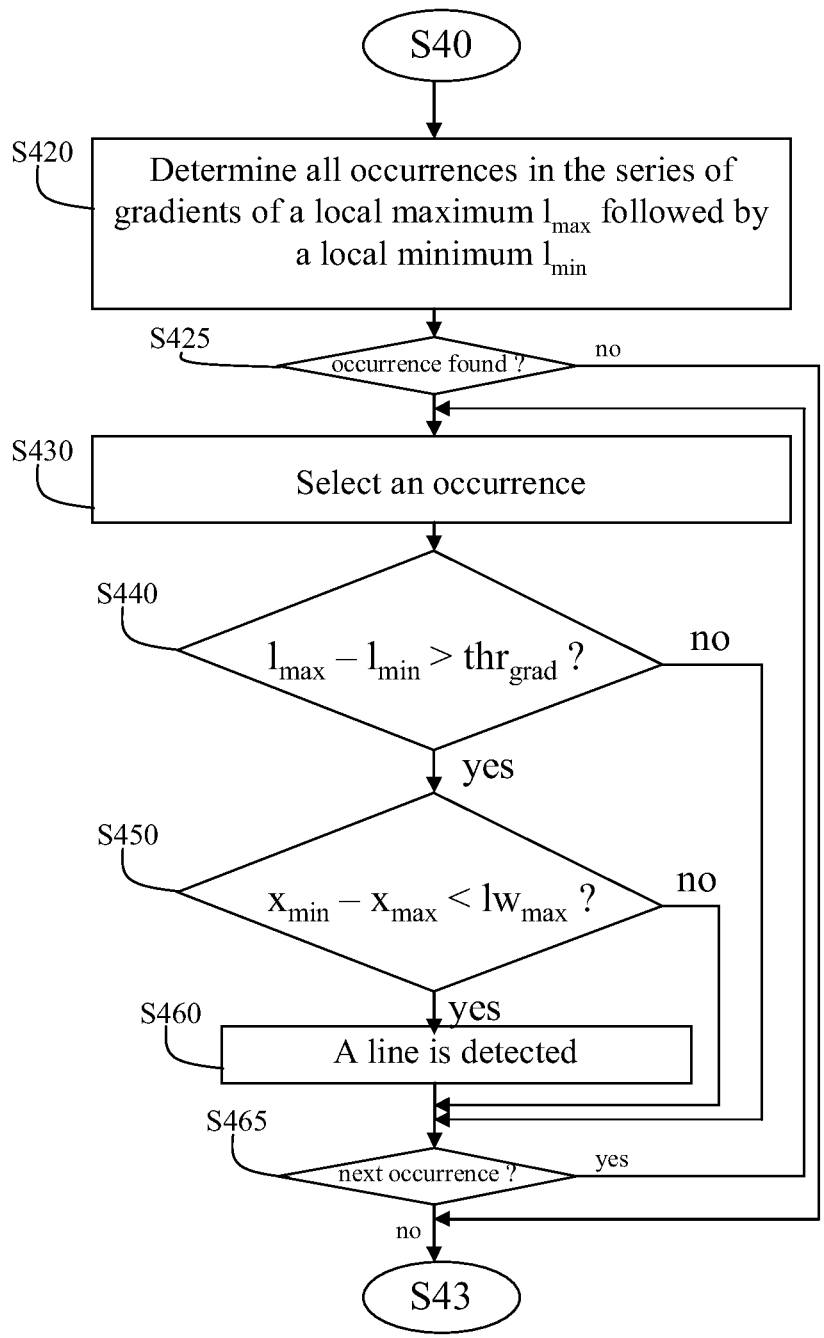
FIG. 4 is a flow diagram in order to detect lines in the document.

A next step S40 is to detect lines in the document by means of the series of gradients under investigation. The line detection is further explained by means of steps in a flow diagram as shown in FIG. 4. A first sub-step S420 is to find in a series of gradients, all occurrences of a local maximum $l_{max}$ followed by a local minimum $l_{min}$ or vice versa. The series of gradients may contain a local maximum $l_{max}$ followed by a local minimum $l_{min}$ or vice versa, which may indicate the presence of a line in the image. In order to evaluate the presence of a line, a gradient threshold $thr_{grad}$ is introduced as an input parameter for the method. In an alternative embodiment, the gradient threshold $thr_{grad}$ is implemented as a constant hard-coded parameter.

In a next step S425, it is checked if an occurrence of one local maximum followed by a local minimum or vice versa is found. If not (no), the method continues with step S43 according to FIG. 3. If an occurrence is found (yes), a next sub-step S430 is to select such an occurrence. After the selection of the occurrence, a next sub-step S440 is to compare the absolute value of the difference of the local maximum $l_{max}$ and the local minimum $l_{min}$ with the gradient threshold $thr_{grad}$. If the absolute value of the difference of a local maximum $l_{max}$ and a local minimum $l_{min}$ is bigger than the gradient threshold $thr_{grad}$ (yes), the presence of a line is assumed, which line may be a candidate for a line of a table in the document. A minimum value, a maximum value and a default value for such a gradient threshold $thr_{grad}$ may be respectively 0, twice the square root of the tile size value and the square root of the tile size value. In the case of a tile in the form of a rectangle, the minimum value, the maximum value and the default value for a horizontal profile may differ proportionally from respectively the minimum value, the maximum value and the default value for a vertical profile. If the absolute value of the difference of the local maximum $l_{max}$ and the local minimum $l_{min}$ is not bigger than the gradient threshold $thr_{grad}$ (no), the presence of a line is not assumed. In a next step S465, it is checked if there is a next occurrence available. If so (yes), the method returns to the step S430 of selecting in the same series of gradients, a next occurrence of a local maximum followed by a local minimum or vice versa. If not (no), the method continues with step S43 according to FIG. 3.

In case the presence of a line is assumed, in a next sub-step S450 a position $x_{max}$ of the maximum and a position $x_{min}$ of the minimum in the profile is determined, which relates to the position of a possible line in the tile. The position of a tile in the image may be easily detected when offset information of the tile in the image is stored. The distance between the position $x_{max}$ of the maximum and the position $x_{min}$ of the minimum in a series of gradients is assumed to be the width of the line. A line that is detected via a series of gradients may be assumed to be part of a table, if the width of the line is less than a maximum line width $lw_{max}$. Therefore, in the sub-step S450, the line width is compared with the maximum line width $lw_{max}$. If the difference of the position $x_{min}$ of the local minimum $l_{min}$ and the position $x_{max}$ of the local maximum $l_{max}$ is smaller than the maximum line width $lw_{max}$, (yes), the presence of a line is detected (S460), which line may be a candidate for a line of a table in the document. The maximum line width $lw_{max}$ may be an input parameter of the method. In an alternative embodiment, the maximum line width $lw_{max}$ is implemented as a constant hard-coded parameter. The method continues with sub-step S465.

If the difference of the position $x_{min}$ of the local minimum $l_{min}$ and the position $x_{max}$ of the local maximum $l_{max}$ is not smaller than the maximum line width $lw_{max}$ (no), the presence of a line is not detected. The method continues with sub-step S465.

In sub-step S465 it is checked if there is a next occurrence available. If so (yes), the method returns to sub-step S430. If not (no), the method continues with step S43 according to FIG. 3.

The maximum line width $lw_{max}$ may vary between 0 and the tile size, where the values equal to 0 and equal to the tile size are excluded. A default value for the maximum line width $lw_{max}$ may be used, e.g. 30 at a tile size of 50×50 pixels. By using this maximum line width $lw_{max}$, solid black, grey or other full-color areas are excluded from line detection.

Figure 5:
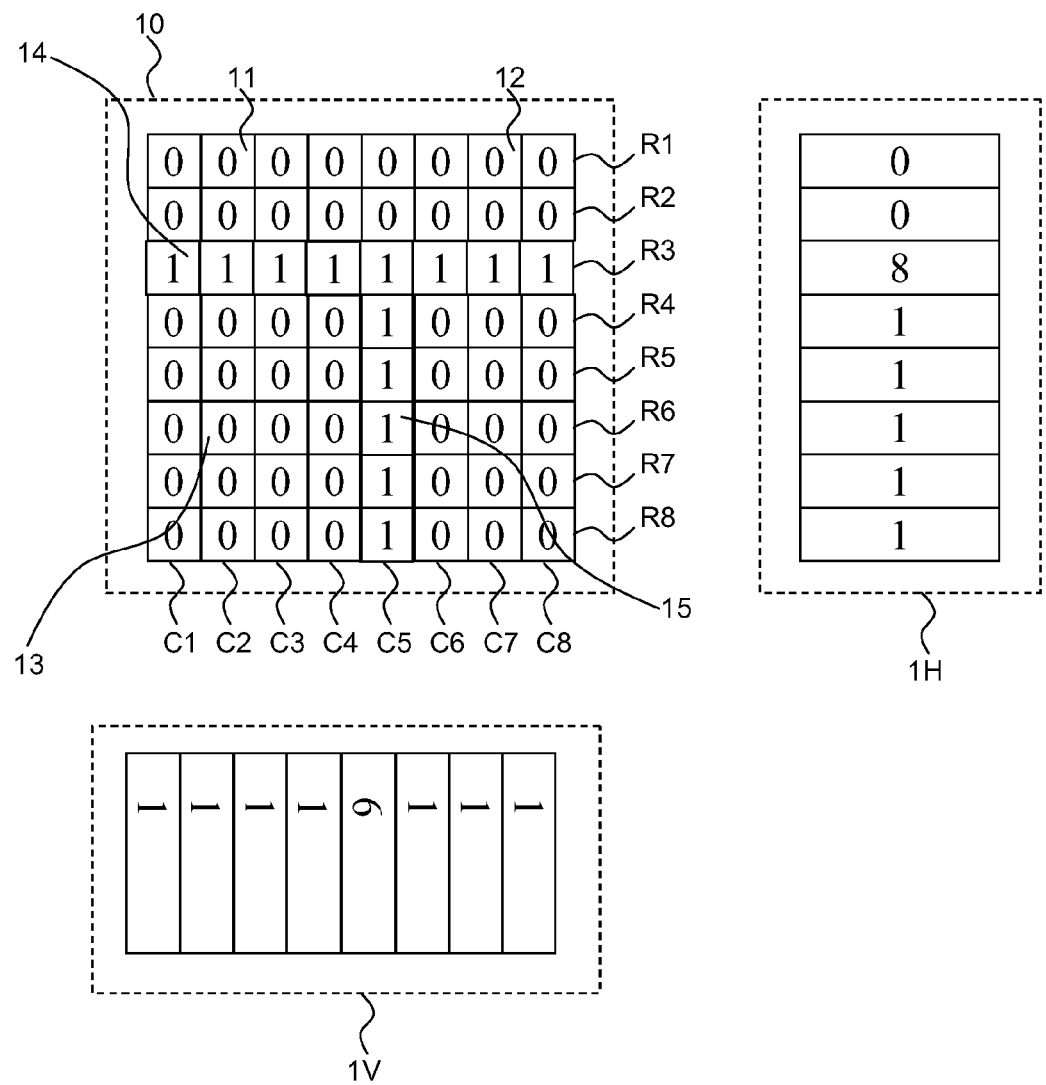
FIG. 5 illustrates line detection in a tile according to the method of the present invention.

An example of the application of line detection, as explained by the flow diagram of FIG. 4, is shown in FIG. 5.

When starting to analyze an image for detection of a table, we divide the image into tiles of a predetermined tile size. For each tile, an offset is calculated to a predetermined origin of the image. According to FIG. 5, a tile 10 is shown with a tile size of 8×8 pixels. Since the tile 10 is a square of pixels, the total number of pixels in the tile is equal to 8×8=64 pixels. The tile size of 8×8 pixels is chosen to demonstrate the principle of the horizontal profile and the vertical profile. In practice, a larger tile size, e.g. 50×50 pixels, may be used. The tile 10 contains 8 rows R1-R8. The tile 10 contains also 8 columns C1-C8. Some pixels 11, 12, 13 are colored white and some pixels 14, 15 are colored black. The white pixels are digitized by the number 0. The black pixels are digitized by the number 1. The numbers in the tile in this example are 0 and 1, but in general the numbers may be also any number between 0 and 1. This is useful in the case of grey level data and a continuous tone image.

To establish a horizontal profile 1H, a summation of pixel values for each row is determined. To establish a vertical profile 1V, a summation of pixel values for each column is determined. The horizontal profile 1H contains the values 0, 0, 8, 1, 1, 1, 1, 1, respectively, for the rows R1-R8. The vertical profile 1V contains the values 1, 1, 1, 1, 6, 1, 1, 1, respectively, for the columns C1-C8. Now, series of gradients of both vertical and horizontal profiles are used to detect lines. The series of gradients of the horizontal profile is calculated by taking difference quotients of neighboring horizontal profile values and the distance of the corresponding neighboring pixel rows of the tile. The series of gradients of the vertical profile is calculated by taking difference quotients of neighboring vertical profile values and the distance of the corresponding neighboring pixel columns of the tile. Presumed is that the distance between two neighboring columns is set to 1 and that the distance between two neighboring rows is also set to 1.

The difference quotients for the horizontal profile are 0/1, 8/1, −7/1, 0/1, 0/1, 0/1, 0/1. The second and third difference quotient are absolutely large, a local maximum of value 8 followed by a local minimum of value −7 is detected in the second and third difference quotient. This refers to a local maximum in the $3^{rd}$ row R3 in the tile 10, being an indication of the presence of a line or a part of a line in the $3^{rd}$ row R3 in the tile 10. To let these indications for the presence of lines becomes reality at application of the method, a gradient threshold is introduced, e.g. 8 being equal to the square root of the tile size. If the absolute difference of the local maximum and the local minimum is greater than the gradient threshold, then the presence of a line is assumed. In the present case in the horizontal profile, the absolute difference is 8−(−7)=15, which is greater than the gradient threshold equal to 8, so a horizontal line is considered to be present.

The difference quotients for the vertical profile are 0/1, 0/1, 0/1, 5/1, −5/1, 0/1, 0/1. The fourth and fifth difference quotient are absolutely large, a local maximum of value 5 followed by a local minimum of value −5 is detected in the fourth and the fifth difference quotient. This refers to a local maximum in the $5^{th}$ column C5 in the tile 10, being an indication of the presence of a line or a part of a line in the $5^{th}$ column C5 in the tile 10. If the absolute difference of the local maximum and the local minimum is greater than the gradient threshold, then the presence of a line is assumed. In the present case in the vertical profile, the absolute difference is 5−(−5)=10, which is greater than the gradient threshold equal to 8, so a vertical line is considered to be present.

Lines that are small in relation to the tile size will be lost, thanks to the gradient threshold. Such a line has a profile value, which is smaller than the gradient threshold and is considered as noise rather than a line. To be considered as a line, data must be consistent over the tile, for example, data that reflect a vertical or horizontal plain line (the vertical profile value is equal to the number of rows in the tile in case of a vertical plain line and the horizontal profile value is equal to the number of columns in the tile in case of a horizontal plain line). An optimum is selected for the gradient threshold in order to balance between a higher gradient threshold with fewer detected lines and a lower gradient threshold with many detected lines (too much noise is considered as lines). Experiences reveal that a gradient threshold being equal to the square root of the tile size (in case of a square tile) gives good results.

The distance between a local maximum and a local minimum in a profile gives the line width. In the present case, the line width for the detected horizontal line in the $3^{rd}$ row R3 is equal to 1, as well as the line width of the detected vertical line in the $5^{th}$ column C5. The position of a horizontal or vertical line in the image is easily computable thanks to the already calculated offset value of the tile in the image.

An extra test may be introduced related to the width of a detected line. The width of a line may be less than a maximum line width input parameter, for the present invention, for example, 6. Since the line width of the horizontal line as well as the vertical line in the tile 10 equals 1, being less than the maximum line width input parameter equal to 6, the detected lines are considered to be appropriate lines for the further steps of the method.

The next step S50 in the method is to detect persistent lines in a number of consecutive tiles. This step is explained by sub-steps S510-S530 shown in the flow diagram of FIG. 6.

Since a line of a table has a predetermined minimum length, it depends on the tile size, if a line of a table will be detected in one tile or more consecutive tiles. Often a line of a table is detected, which line occurs in consecutive tiles. This may be consecutive tiles in a horizontal direction, as well as consecutive tiles in a vertical direction. Since a small line in each tile may be part of a larger line that consists of smaller lines being present in consecutive tiles, the step S50 comprises determining of a number of consecutive tiles and awarding a line persistency dependent on the presence of the line in all of the number of consecutive tiles.

In order to increase the accuracy of the method, tiling may be done in such a manner that tiles overlap. An overlapping factor, which may vary between 0 and 1, determines the degree of overlapping. An overlapping factor equal to 0 indicates that there is no overlapping between consecutive tiles. An overlapping factor equal to 1, which would determine a complete overlap of consecutive tiles, may be excluded. A default value for the overlapping factor may be 0.5, which means that half of a tile is overlapped by a consecutive tile in one direction. Preferably, overlapping takes place in a horizontal direction as well as in a vertical direction of the image.

When all tiles have been analyzed in the previous steps S15, S20, S30, S40, all detected lines $l_1$-$l_m$ are inspected in step S50. Lines that are long enough are kept. Short lines may not be part of rectangles large enough to be tables of the document. Only persistent lines may be kept in the race. Persistent lines are the ones that are detected in a certain number $n_{consec}$ of consecutive tiles. This number $n_{consec}$ is may be an input parameter of the method and depends on the overlap factor of the tiles. In an alternative embodiment, the number $n_{consec}$ is implemented as a constant hard-coded parameter. A number of lines that occur in the same row of a number of horizontal consecutive tiles are considered to be the same horizontal persistent line. A number of lines that occur in the same column of a number of vertical consecutive tiles are considered to be the same vertical persistent line. Therefore in a sub-step S510, the lines $l_1$-$l_m$ are grouped into k groups of lines in m, consecutive tiles. For each of the groups of lines, the number m, is compared to the number $n_{consec}$ in a next sub-step S520. If the number m, is greater than or equal to the number $n_{consec}$, the i-th group of lines forms a persistent line as shown in sub-step S530. After inspecting all k groups of lines, a number of persistent lines are detected, which are candidates for being part of a table of the document.

Figure 7:
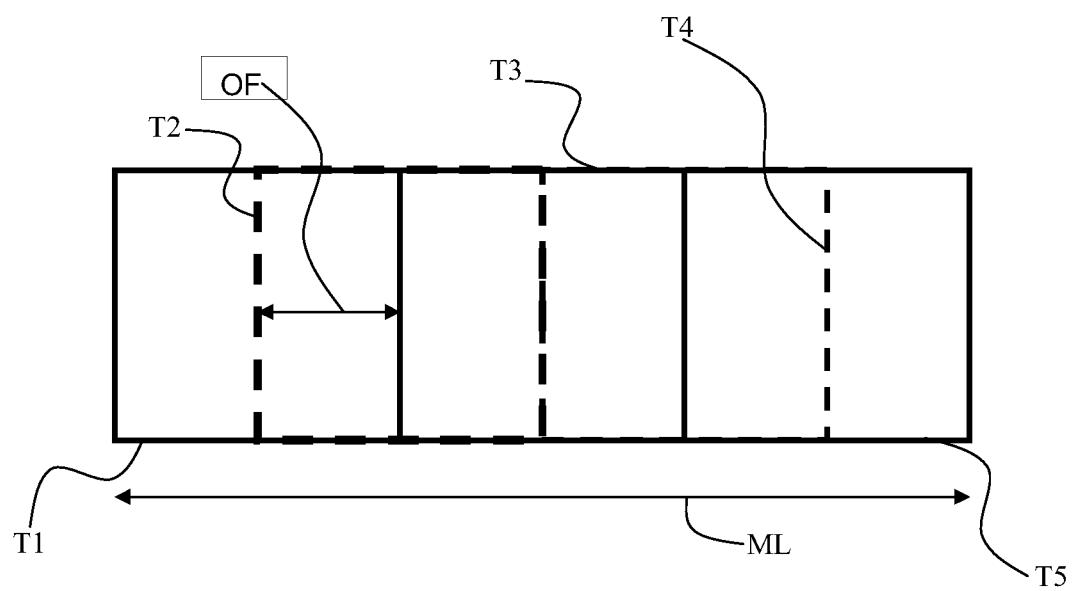
FIG. 7 illustrates tiling with an overlap factor and a minimum line length.

In FIG. 7, five consecutive tiles T1, T2, T3, T4, T5 are shown, which overlap each other with an overlap factor as indicated by a first arrow OF. In this particular case, the overlap factor equals 0.5. In the case of a tile size equal to 8×8 pixels, the overlap is 4 pixel columns. The five consecutive tiles T1, T2, T3, T4, T5 contain rows of each 3×8=24 pixels. If the number of consecutive tiles $n_{consec}$ for assuming persistent lines is equal to 5, the minimum total size of detected lines is 24 pixels. This may be also called a minimum line length as shown by a second arrow ML in FIG. 7.

Figure 8:
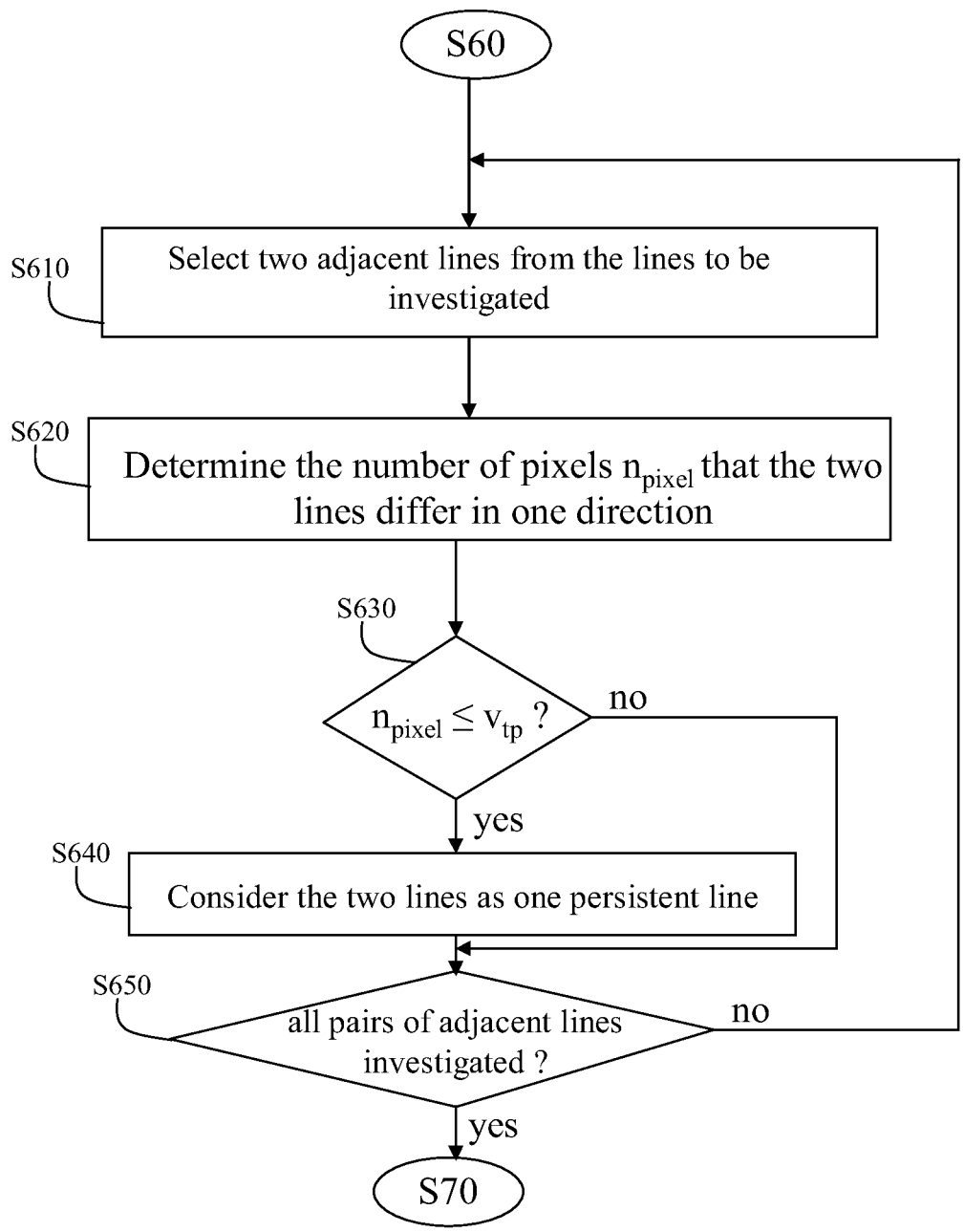
FIG. 8 is a flow diagram in order to detect persistent lines by means of slant correction.

A next step S60 in the method is to detect persistent lines by means of slant correction. The sub-steps S610-S650 of this step S60 are shown in FIG. 8, and are applied to the persistent lines detected in step S50, and are also applied to the lines that are already detected in step S40 and have not been detected as persistent lines in step S50.

Since a profile is computed by using tiling, and tile overlapping is applied to detected lines in the image, slant effects in the image may be corrected. A value $v_{tp}$ of a tolerance parameter tp is an input parameter of the method in order to correct slant effects. In an alternative embodiment, the value $v_{tp}$ of the tolerance parameter tp is implemented as a constant hard-coded parameter. From the lines to be investigated each time, a pair of lines in horizontal adjacent tiles or a pair of lines in vertical adjacent lines is selected in a first sub-step S610. The number of pixels $n_{pixel}$ that the two selected adjacent lines differ in one direction is determined in a next sub-step S620. The number of pixels $n_{pixel}$ is compared to the value $v_{tp}$ of the tolerance parameter tp in a next sub-step S630. If the number of pixels $n_{pixel}$ is less than or equal to the value $v_{tp}$ of the tolerance parameter tp, the two adjacent lines are considered to be the same horizontal or vertical persistent line respectively in a next sub-step S640. In a next sub-step S650, it is checked if all pairs of adjacent lines are investigated. If not, the previous sub-steps S610, S620, S630 are repeated. A default value $v_{tp}$ for such a tolerance parameter tp may be 5. An advantage is that such a tolerance parameter tp may be applied on native files as well as scanned files. In this way the potential skew effect for scans is taken into account.

A compensation of a slant effect is applied to take into account a potential skew effect, as illustrated in FIG. 9a-9d. To take into account the slant effect, the tolerance parameter tp is applied on the position of persistent lines detected in the previous steps. The slant effect compensation is applied to all so far detected lines, from which their length and position is known. Therefore the whole image is taken into consideration.

Figure 9:
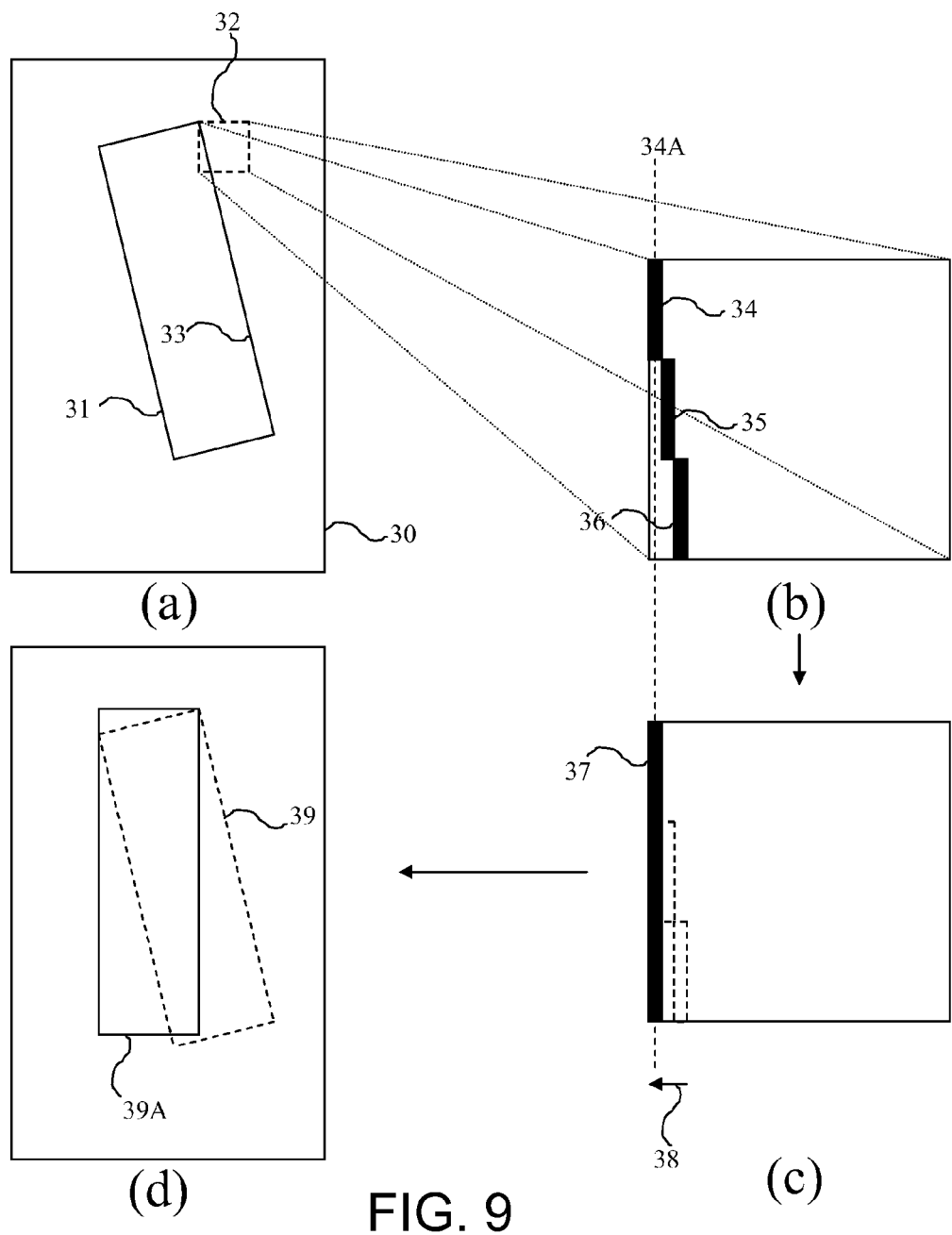
FIG. 9 illustrates an example of slant correction.

FIG. 9a shows an image 30 containing a slanted rectangle 31. By means of this slanted rectangle 31, it is shown how the slant effect compensation works locally. When zooming in on a pixel level of a first region of interest 32 of a slanted line 33 of the slanted rectangle 31, which region 32 consists of a plurality of adjacent tiles in both a vertical and a horizontal direction, we detect smaller (vertical) lines 34, 35, 36 as shown in FIG. 9b. The lines 34, 35, 36 may each extend over one or more tiles. FIG. 9b shows that the part of the slanted line 33 consists of three vertical lines 34, 35, 36 of (black) pixels. The vertical lines 34, 35, 36 are separated by less than 3 pixels. If the tolerance parameter tp happens to be equal to 3 or larger, the vertical lines 34, 35 and 36 are considered to be part of the same persistent line 37, which is shown in FIG. 9c. The position of the upper line 34 is assumed to be a reference position for the slant effect compensation. This reference position is indicated with the dashed line 34A. An arrow 38 indicates the slant effect compensation by which the lower lines 35, 36 are shifted below the upper line 34 to the reference position indicated by the dashed line 34A. A next region below the first region 32 is now investigated. If adjacent lines are detected in this next region, which are separated by less than 3 pixels from the lowest line 36, these lines are also shifted to the reference position 34A. In this way, a number of regions that cover the rectangle 31 are handled. If this slant effect compensation is applied for the lines covering the rectangle 31, a result is achieved as displayed in FIG. 9d. A real slanted rectangle 39 with dashed lines is to be considered as the compensated rectangle 39A with solid lines. For teaching reasons, the slanting of rectangle 31 has been exaggerated.

Once all vertical and horizontal lines and the less slanted lines have been detected in the whole image, a next step S70 of the method is to look for rectangles being candidates for a table in the document. By detecting persistent lines according to the previous steps S50-S60, at least one rectangle may be determined. For example, four lines, two of which are horizontally directed and two of which lines are vertically directed, may form a rectangle according to a mathematical definition of a rectangle. According to an embodiment of the method, the at least one rectangle is determined from the persistent lines by determining margins of the document and taking the largest rectangle in a corner taking said margins into account. In principle, the biggest rectangle in each corner is looked for. To be considered as a potential table of the document, the rectangle must be close enough to the border of the image. In both directions, a maximum distance may be used, which is equal to a fraction of the image size, for example a tenth of an image size, where the image size equals the height for a vertical direction and the image size equals the width for a horizontal direction. Even if a new detected rectangle is bigger than the current biggest one rectangle, it may be rejected if it is too far from the border. Note that the inking area borders may be considered as the borders of the image. In other words, the margins are taken into account. This step S70 reduces the number of candidate rectangles to at most 4.

However, not all determined rectangles may be a table of the document, for example because of their size, position or morphology. In a particular case, no determined rectangle is accepted as a table of the document. The conclusion in that particular case is that the document does not contain such a table.

Figure 10:
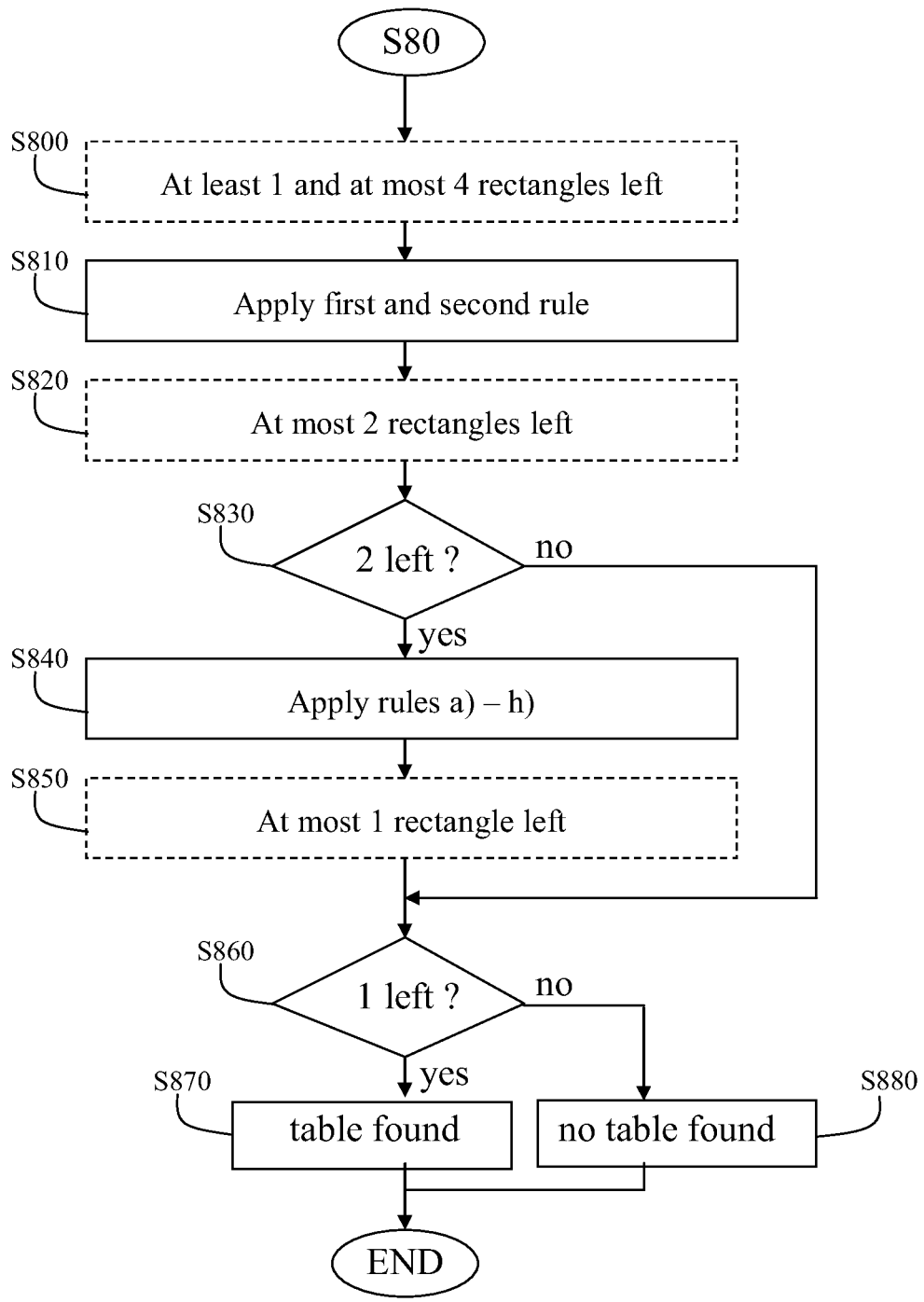
FIG. 10 is a flow diagram in order to apply heuristics to remaining candidate rectangles.

Heuristics are developed by the applicants to be applied in order to accept or reject a determined rectangle as a table of the document. In a next step S80 of the method, heuristics are applied to the at least 1 and at most 4 remaining candidate rectangles from step S70. Sub-steps S800-S880 of the heuristics have been explained by means of FIG. 10.

When a rectangle has been detected in a corner, the goal is to know if it can be a table of the document or not. Simple rules are applied on the rectangle, which can be rejected if it does not comply with table properties. These rules have been determined by observing test files. Hereinafter, an ordered list is given of the rules applied on candidate rectangles.

Hard-coded values have been tuned by experience on a representative test set of files.

The starting status S800 is that at least 1 and at most 4 remaining candidate rectangles are to be investigated. A first rule and a second rule are applied in a first sub-step S810.

The first rule is that a candidate rectangle is rejected if one of its dimensions (width, height) is 15 times greater than the other dimension. This results in the rejection of rectangles which are too thin.

Figure 11:
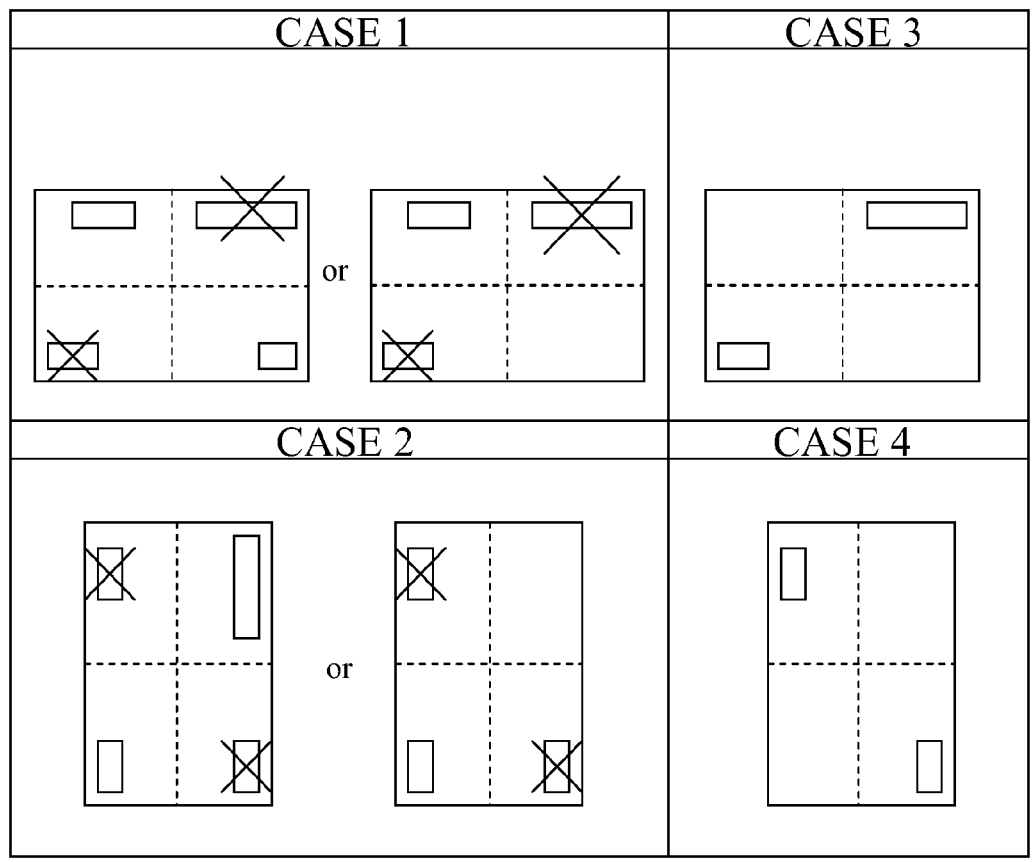
FIG. 11 illustrates the heuristics application in cases CASE 1, CASE 2, CASE 3, CASE 4.

The second rule is dependent on the orientation of the image, which has four corners, described as a top left corner, a top right corner, a bottom left corner and a bottom right corner. Four cases (CASE 1, CASE 2, CASE 3, CASE 4) may be distinguished as illustrated in FIG. 11.

If the input image has a landscape orientation, rectangles in the top right corner and rectangles in the bottom left corner are rejected, only if there is at least one rectangle present in the top left corner or in the bottom right corner of the image (CASE 1).

If the input image has a portrait orientation, rectangles in the bottom right corner and rectangles in the top left corner are rejected, only if there is at least one rectangle present in the top right corner or in the bottom left corner of the image (CASE 2).

CASE3 is the situation of CASE1 not fulfilled, but the image is landscape.

CASE4 is the situation of CASE2 not fulfilled, but the image is portrait.

In FIG. 11, all rejected rectangles are marked by a cross sign over each rejected rectangle.

By applying the two above-mentioned rules, a next status S820 is achieved in which the number of remaining candidate rectangles equals at most 2.

Many other rules may be applied after the second rule, for example:

a) Rectangles may be rejected, if they have no intersections with the image borders, which are delimited by the most extreme detected lines in the image.

b) Rectangles may be rejected if they are too far from the image borders. The maximum distance from borders may be equal to a predetermined number of times the distance of the nearest rectangle from the borders. Such a predetermined number may be 4.

c) If the number of remaining rectangles is equal to 2, one rectangle is rejected if it has an area which is a predetermined number of times smaller than the other one. Such a predetermined number may be 10.

d) If the number of remaining rectangles is equal to 2 and CASE1 is fulfilled, a portrait rectangle (if one) is rejected if the other one is landscape.

e) If the number of remaining rectangles is equal to 2 and CASE2 is fulfilled, a landscape rectangle (if one) is rejected if the other one is portrait.

f) If the number of remaining rectangles is equal to 2 and CASE3 is fulfilled, a landscape rectangle (if one) is rejected if the other one is portrait.

g) If the number of remaining rectangles is equal to 2 and CASE4 is fulfilled, a portrait rectangle (if one) is rejected if the other one is landscape.

h) If the number of remaining rectangles is equal to 2, reject the rectangle which is farthest from the borders.

After applying the rules a)-h), a next status S850 is achieved in which the number of remaining candidate rectangles is equal to one or zero.

If the number of remaining candidate rectangles equals zero, a next status S880 is achieved in which no table is found. If the number of remaining candidate rectangles equals one (S860), another status S870 is achieved in which a table is found. The corner of the image where the table is located, the position of the table in the image and the dimensions of the detected table are known and may be used for further processing.

Heuristics may depend on the kind of image-processing apparatus which comprises a control unit in order to detect a table, for example a title block, in a document to be processed. This means that for two different machines, heuristics may be different. The heuristics described above are an example of heuristics. Heuristics may also be changed depending on the kind of images to be processed. Such heuristics may be derived from test files, resulting in a different decision algorithm, i.e. different heuristics.

The mentioned parameters such as tile size, overlap factor, maximum line width, gradient threshold and tolerance parameter also depend on and are to be tuned to the kind of images to be processed. The mentioned parameters tile size, overlap factor, maximum line width, gradient threshold and tolerance parameter may be input parameters for the method. In an alternative embodiment the mentioned parameters tile size, overlap factor, maximum line width, gradient threshold and tolerance parameter are implemented as constant hard-coded parameters. In an alternative embodiment, it is necessary to minimize the detection of false positives of lines on a poster, a photo or a GIS file. Irregular lines on a map, for example rivers or roads, may seem to form rectangles.

In an alternative embodiment, the input image is coded such that a black pixel has the value 1 and a white pixel has the value 0, and grey pixels have values in between. An input parameter for such an embodiment of the method is a photometric convention. The above mentioned code is called the "min-is-black" convention, while the reverse code is called the "min-is-white" convention. The "min-is-white" convention detection of a line by means of the gradient is carried out by first looking for a local minimum followed by a local maximum, instead of first looking for a local maximum followed by local minimum in case of the "min-is-black" convention.

By using such a parameter, it is possible to process a broader range of input images.

In an advantageous embodiment, the method is applied to a color image. Color information is not necessary for the method. A black-and-white input image or a grey level image is sufficient. To be applied to a color image, the color image is converted into one plane image first, for example black & white, 1 bit per pixel or a grey level bitmap, 8 bit per pixel. A document—color or not—may be rasterized in a black-and-white image of, for example 100 dots per inch, with specific gamma curves to guarantee line conservation. The result is a halftone image which is an input image on which the steps of the method according to the present invention are applied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for automatically locating tables in documents, the method comprising the steps of:
defining a plurality of tiles for a document;
determining a horizontal profile and a vertical profile for each of the plurality of tiles;

detecting lines by means of the horizontal and vertical profiles;

determining at least one rectangle from the lines;

accepting from the at least one rectangle a rectangle as a table of a document;

determining a location of a line by means of a gradient of one of the horizontal profiles and the vertical profiles;

selecting persistent lines from the located lines;

determining at least one rectangle from said persistent lines; and for each determined rectangle, applying heuristics in order to accept or reject the rectangle as a table of the document;

wherein the step of selecting lines that are persistent comprises the steps of determining a tolerance parameter and considering lines in consecutive tiles, which lines are not separated by more pixels than the value of the tolerance parameter as the same persistent line.

2. The method according to claim 1, wherein said plurality of tiles cover at least part of an image of the document, overlap each other by a predetermined overlap factor and have a predetermined tile size.

3. The method according to claim 1, wherein the step of determining the at least one rectangle from said persistent lines comprises the steps of determining margins of the document and taking the largest rectangle in a corner taking said margins into account.

4. The method according to claim 1, wherein the step of determining a location of a line by means of a gradient of one of the horizontal profiles and the vertical profiles comprises the steps of determining a gradient threshold value and inspecting the gradient in order to find a local maximum in the gradient followed by a local minimum in the gradient, wherein an absolute difference between the local maximum and the local minimum is bigger than the gradient threshold value.

5. The method according to claim 1, wherein the step of selecting lines that are persistent comprises the step of awarding a line persistency dependent on the width of said line.

6. The method according to claim 1, wherein the step of selecting lines that are persistent comprises the steps of determining a number of consecutive tiles and awarding a line persistency dependent on the presence of said line in all of the number of consecutive tiles.

7. The method according to claim 1, wherein to accept or reject the determined rectangle depends on the ratio of a height and width of the rectangle.

8. The method according to claim 1, wherein to accept or reject the determined rectangle depends on the presence of rectangles in at least one of the corners of the image of the document and on the orientation of the image of the document.

9. The method according to claim 1, further comprising the step of applying the method to title block location in technical drawings.

10. An apparatus for automatically locating a table in a document comprising a processor and an image processing unit to execute the method according to claim 1.

* * * * *